United States Patent
Linker et al.

(10) Patent No.: US 7,113,921 B2
(45) Date of Patent: *Sep. 26, 2006

(54) METHOD AND SYSTEM FOR AUTOMATICALLY DISPLAYING AN IMAGE AND A PRODUCT IN A PAGE BASED ON CONTEXTUAL INTERACTION AND METADATA

(75) Inventors: Debra L. Linker, Sammamish, WA (US); Stephen D. Land, Seattle, WA (US); Jeffrey Vincent Gelfuso, Sammamish, WA (US); William T. Radcliffe, Redmond, WA (US)

(73) Assignee: Corbis Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/008,063

(22) Filed: Dec. 8, 2004

(65) Prior Publication Data
US 2005/0102201 A1    May 12, 2005

Related U.S. Application Data

(63) Continuation of application No. 09/517,134, filed on Mar. 2, 2000, now Pat. No. 6,901,378.

(51) Int. Cl.
*G06F 17/30* (2006.01)
*G06Q 30/00* (2006.01)
(52) U.S. Cl. ...................................... 705/27
(58) Field of Classification Search ............... 705/27; 707/9
See application file for complete search history.

(56) References Cited

U.S. PATENT DOCUMENTS 5,493,677 A  2/1996  Balogh et al.
5,530,759 A  6/1996  Braudaway et al.
5,664,111 A  9/1997  Nahan et al.
5,898,594 A  4/1999  Leason et al.
5,960,411 A  9/1999  Hartman et al.
5,960,412 A  9/1999  Tackbary et al.
5,983,201 A  11/1999 Fay
6,017,157 A  1/2000  Garfinkle et al.
6,058,417 A  5/2000  Hess et al.
6,141,482 A  10/2000 Massarksy
6,285,775 B1 9/2001  Wu et al.

(Continued)

FOREIGN PATENT DOCUMENTS

EP    0938053    8/1999

OTHER PUBLICATIONS

Mehling, H., "DeltaPoint's QuickSite Offers E-Commerce Capabilities," Computer Reseller News, p. 62, Aug. 4, 1997.

(Continued)

*Primary Examiner*—Nicholas D. Rosen
(74) *Attorney, Agent, or Firm*—Darby & Darby PC; John W. Branch

(57) ABSTRACT

The invention provides a method, system and computer-readable medium for storing images with related information in a relational database and using the information to order available products for a selected image over a network. A unique identifier is generated for each image, allowing different types of searches of the relational database to be performed including product-based and image-based searches. A selection of a returned image causes a cut-down version of the image and all available products to be displayed on a page. If a product is selected, a server enables a transaction for a user to order the selected product. A HTTP Cookie may be employed to store a user identifier, allowing use of user profiles for customization of particular options and displayed products.

26 Claims, 14 Drawing Sheets

U.S. PATENT DOCUMENTS

| | | | |
|---|---|---|---|
| 6,344,853 B1 | 2/2002 | Knight | |
| 6,369,835 B1 | 4/2002 | Lin | |
| 6,438,579 B1 | 8/2002 | Hosken | |
| 6,466,975 B1 | 10/2002 | Sterling | |
| 6,493,677 B1 | 12/2002 | von Rosen et al. | |
| 6,493,743 B1 | 12/2002 | Suzuki | |
| 6,505,202 B1 | 1/2003 | Mosquera et al. | |
| 6,507,841 B1 | 1/2003 | Riverieulx de Varax | |
| 6,526,155 B1 | 2/2003 | Wang et al. | |
| 6,624,909 B1 | 9/2003 | Czyszczewski et al. | |
| 6,629,143 B1 | 9/2003 | Pang | |
| 6,795,967 B1 * | 9/2004 | Evans et al. | 719/310 |
| 2001/0031102 A1 | 10/2001 | Lunetta et al. | |
| 2001/0034635 A1 | 10/2001 | Winters | |
| 2001/0034666 A1 | 10/2001 | Berliner | |
| 2001/0034668 A1 | 10/2001 | Whitworth | |
| 2002/0052803 A1 | 5/2002 | Amidhozour et al. | |
| 2004/0044590 A1 | 3/2004 | Voorhees | |
| 2005/0071257 A1 * | 3/2005 | Giannini | 705/27 |

OTHER PUBLICATIONS

Strom, D., "Building Your Online Store Front," InfoWorld, vol. 20, No. 5, p. 45, Feb. 2, 1998.

Hausman, E. et al., "Too Slow, Limited to One Distributor—Resellers Say Offerings Fall Short," Computer Reseller News, p. 7, Mar. 2, 1998.

Anon., "Tribune Company Invests in Picture Network International, Electronic Photo Archive and Marketing Company," PR Newswire, Mar. 1, 1993.

Smith, K. J., Customization is Key to Case Promotions: National Program Addresses Local Dealer Needs,38 Promo, p. 91, Jun. 1993.

Anon., "Digital Imaging Tools from IronMike Software: 300 Installed at 50 Sites," Seybold Report on Publishing Systems, vol. 23, No. 9, p. 32, Jan. 3, 1994.

Anon., "Image Databases," Seybold Report on Publishing Systems, vol. 24, No. 3, p. T54, Oct. 26, 1994.

Anon., "Here's One for Your XMas List," (Abstract only), Forbes, vol. 156, No. 7, p. 190, Sep. 25, 1995.

Anon., "Seeing Your Photos a Whole New Way," Business Wire, p. 12121138, Dec. 12, 1996.

Microsoft Press Computer Directory, Third Edition, Microsoft Press, 1997, pp. 38, 217, 270, 317, 338, 403, 404, 451, 468 and 505.

Falkenberg, L., "Virtually Made to Order," Money, Vol. 1, No. 2, pp. 60-61, Fall 1998.

Anon., "Reuters Supports XML," Seybold Report on Publishing Systems, Jan. 17, 2000.

* cited by examiner

DATABASE FLAT FILE W/SQL

| IMAGE ID | SEND | PRINT | POSTCARD | JPEG |
|----------|------|-------|----------|------|
| 000001   | 1    | 0     | 1        | 1    |

DATABASE FLAT FILE W/IPTC

| IMAGE ID | JPEG |
|----------|------|
| 000001   | 1    |

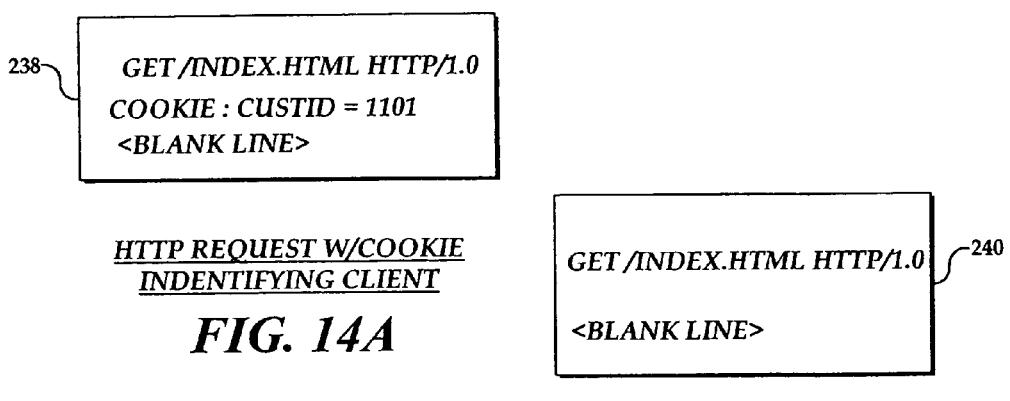
FIG. 14A HTTP REQUEST W/COOKIE INDENTIFYING CLIENT
FIG. 14B HTTP REQUEST WITHOUT COOKIE IDENTIFYING CLIENT
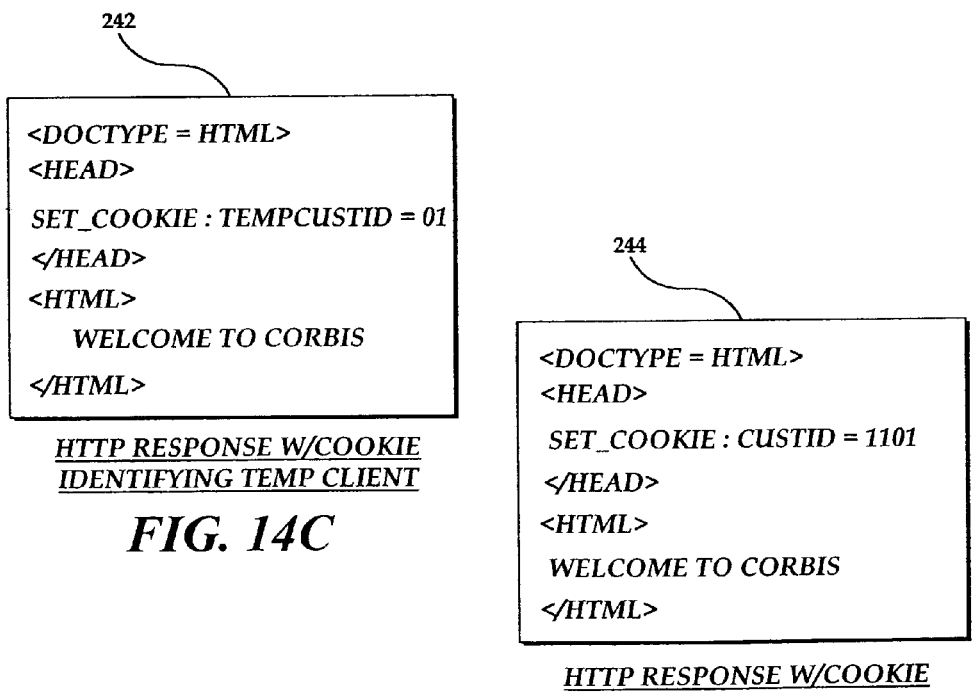
FIG. 14C HTTP RESPONSE W/COOKIE IDENTIFYING TEMP CLIENT
FIG. 14D HTTP RESPONSE W/COOKIE IDENTIFYING CLIENT

METHOD AND SYSTEM FOR AUTOMATICALLY DISPLAYING AN IMAGE AND A PRODUCT IN A PAGE BASED ON CONTEXTUAL INTERACTION AND METADATA

CROSS-REFERENCE TO RELATED APPLICATIONS

This application is a continuation patent application of U.S. patent application Ser. No. 09/517,134, filed Mar. 2, 2000, now U.S. Pat. No. 6,901,378.

BACKGROUND OF THE INVENTION

This utility application relates generally to distributing images over a network, and more specifically, to employing contextual interaction information in combination with information associated with a selected image that is distributed over a network for enabling a representation of an available product to be displayed with the selected image to a user.

Previous methods have employed several factors to determine the products and prices for images ordered over a network. These factors include the content or subject of the image itself, the resolution size, the speed of delivery, the customer's particular use and contract conditions imposed by the actual owner of the image. Often, different methods for determining the value of products for a selected image have tended to fix the price of one or more of these factors for a particular type of customer such as personal, business and educational. However, none of the prior art methods have provided for associating information with an image that indicated which products were available for that particular image. Typically, different types of products were separately displayed and only after a user chose a particular type of product, could the user determine if the chosen product was available for a selected image.

Also, in the past, point of entry pages at web sites were not automatically customized to present products and options related to the particular interests of repeat users. Instead, generic point of entry pages were used and extensive navigation was required by repeat users to locate other pages with information and products of particular interest to the repeat users.

The invention provides for storing images along with information indicating their available products in a database. When one of the stored images is selected, the information associated with the selected image is used in combination with contextual interaction information to display each available product. Alternatively, when a particular product is selected, the invention provides for employing the contextual interaction information to display at least a portion of the images that are available for use with the selected product. Additionally, the invention provides for storing user behavior information for each session and creating a profile for each repeat user based on this information. When a repeat user returns to a web site, the invention employs the profile to automatically customize the point of entry page and offer products and options that match the particular interests of the repeat user.

BRIEF SUMMARY OF THE INVENTION

In accordance with the invention, a method is provided for enabling a product associated with an image to be obtained by a user. In response to receiving contextual interaction information, an image is displayed. The image is associated with information indicating each product that is available for the image. This information is employed to automatically generate a representation of each product that is available for the image. The image and the representation of each product that is available for the image is automatically displayed in a page. When the representation of an available product is selected, the available product for the image is provided to the user. Additionally, the image can be stored in a database that may be relational or object-oriented. The image can be formatted and stored in the database as a picture in any one of several formats including JPEG, TIFF, GIF and PIC. Alternatively, the image may be formatted and stored in the database as a movie in any one of several formats including MPEG, QTM and AVI.

In accordance with other additional aspects of the invention, information associated with the image can be stored in a file that includes the image data. A facility can be employed to create an IPTC format for information associated with the image that is included in the same file as the image data.

In accordance with still other additional aspects of the invention, information associated with the image may be stored in a file that is separate from the file that includes image data. A facility may be employed to associate an SQL attribute with the image. The SQL attribute corresponds to a script that enables functionality of at least the display of the image and a representation of each available product.

In accordance with yet other additional aspects of the invention, the information associated with the image includes image related data such as tag and business. Tag data can include title, location, date, original author, model release, subject matter information and name of a subject in the image. Also, business data may include source, contract, royalty, territory, contract expiration and batch. Additionally, the information associated with the image can identify a type of available product.

In accordance with other additional aspects of the invention, different types of representation for each available product may be displayed, including picture, video, graphical image, graphical icon and text. Also, the page can be an HTML page and the image and each representation of an available product may be displayed in a graphical user interface. Additionally, the display of the image and each representation of an available product can be based on a combination of user information, product information, image information and contextual interaction information.

In accordance with still other additional aspects of the invention, the image stored in the database is a cut-down version of the original image that has a size less than the full size of the original version of the image.

In accordance with other additional aspects of the invention, a non-visible watermark is included in the image that can be identified with an application program.

Also, a visible watermark can be included with the image.

In accordance with yet other additional aspects of the invention, other types of data may be associated with image data stored in the database, including video, sound and graphic. The sound data can have any one of several formats, including WAV and MP3.

In accordance with other additional aspects of the invention, an agent program can be used to automatically determine the image and available products to be displayed. In accordance with still other additional aspects of the invention, a method is provided for using contextual interaction information to enable a product associated with an image to be ordered over a network. A search can be entered in a point of entry page, which is employed to search a database that includes a plurality of images. The result of the search is displayed in a result page. An affirmative result causes at least one image related to the search to be displayed in the result page. In response to a selection of a displayed image in the result page, a product page that includes the representation of each available product for the selected image is displayed. The different types of available products include picture, electronic postcard, poster, screen saver, wallpaper, calendar, stationery, invitation, presentation, slideshow, puzzle and cup. In response to a selection of the representation of the available product in the product page, a create page that includes a representation for each option associated with the selected product is displayed. The options for the selected product include at least one template, and the type of use such as single, free and subscription. In response to a selection of the representation of an option associated with the selected product, a transaction page that includes each option for a transaction to order the selected product is displayed. Also, in response to the selection of the subscription type of use, a subscription page that includes each option for selecting a subscription membership is displayed such as individual, business and institutional. Additionally, options for the transaction to obtain the selected product include send, print, purchase and add to virtual shopping cart.

In accordance with additional aspects of the invention, the search of the database may be subject based and in another embodiment, the search can be product based. For a product based search, options associated with an available product is displayed in another page.

In accordance with other additional aspects of the invention, behavior information and preferences in each session for each user can be generated and stored in a profile corresponding to each user. The profile can be employed to customize the search result from the database for a corresponding current user. The profile may be used to customize the display of the available product for a corresponding current user.

In accordance with yet other additional aspects of the invention, a temporary identifier is assigned to a current user. The temporary identifier is employed to determine when the current user is a repeat user which has a previously assigned permanent identifier. When the determination is affirmative, the behavior information for the current user is added to a previously created profile for the repeat user and the temporary identifier for the current user is changed to the permanent identifier assigned to the repeat user. However, when the determination is negative, the behavior information for the current user is added to another profile created for the current user and the temporary identifier is changed to another permanent identifier that is assigned to the current user. The temporary and permanent identifiers may be included with a Cookie in an HTTP Response.

In accordance with other additional aspects of the invention, a method is provided for enabling a product associated with a sound to be provided to a user. The sound is formatted and stored in a database. The sound format includes WAV and MP3.

Other types of data may be associated with the sound stored in the database, including video, picture and graphic.

In accordance with other additional aspects of the invention, a system which implements substantially the same functionality in substantially the same manner as the methods described above is provided.

In accordance with yet other additional aspects of this invention, a computer readable medium that includes computer-executable instructions may be used to perform substantially the same methods as those described above is provided.

BRIEF DESCRIPTION OF THE DRAWINGS

The foregoing aspects and many of the attendant advantages of this invention will become more readily appreciated, and the same become better understood by reference to the following detailed description, when taken in conjunction with the accompanying drawings, wherein:

FIG. 14A illustrates an exemplary code fragment for an HTTP Request with a Cookie that includes a permanent client identifier;

FIG. 14B shows an exemplary code fragment for an HTTP request without a Cookie;

FIG. 14C illustrates an exemplary code fragment for an HTTP Response with a Cookie that includes a temporary client identifier;

FIG. 14D shows an exemplary code fragment for an HTTP Response with a Cookie that includes a permanent client identifier;

DETAILED DESCRIPTION OF THE INVENTION

The invention provides a method, system and computer-readable medium for displaying an image and/or a product based on the context of user interaction. Images with related information are stored in a relational database and using the information to order available products for a selected image over a network. Tag information may be associated with an image in the database, which can include title, location, date, original author/photographer and the name of the subject. A unique image identifier for each image is stored in the relational database. Also, business information can be associated with the image that may include identification of the source of the original image, batch number and contract limitations on the use of the image. Additionally, the invention may be used to browse the relational database with product or image based searches, subscription "pushes" and hyperlinks that are associated with images, products or categories.

In one embodiment, the invention employs a Hyper Text Transport Protocol (HTTP) Response with a Cookie to store a copy of a client identifier at the client during a network session between the invention and the client. When a client accesses the invention, information associated with the client's behavior and preferences can be stored for each session in a profile that may include the topic of each search and each purchased product. A repeat client's profile can be employed to customize a graphical user interface such as a point of entry page with particular options and products that are related to the client's behavior.

Logic Overview

Figure 1:
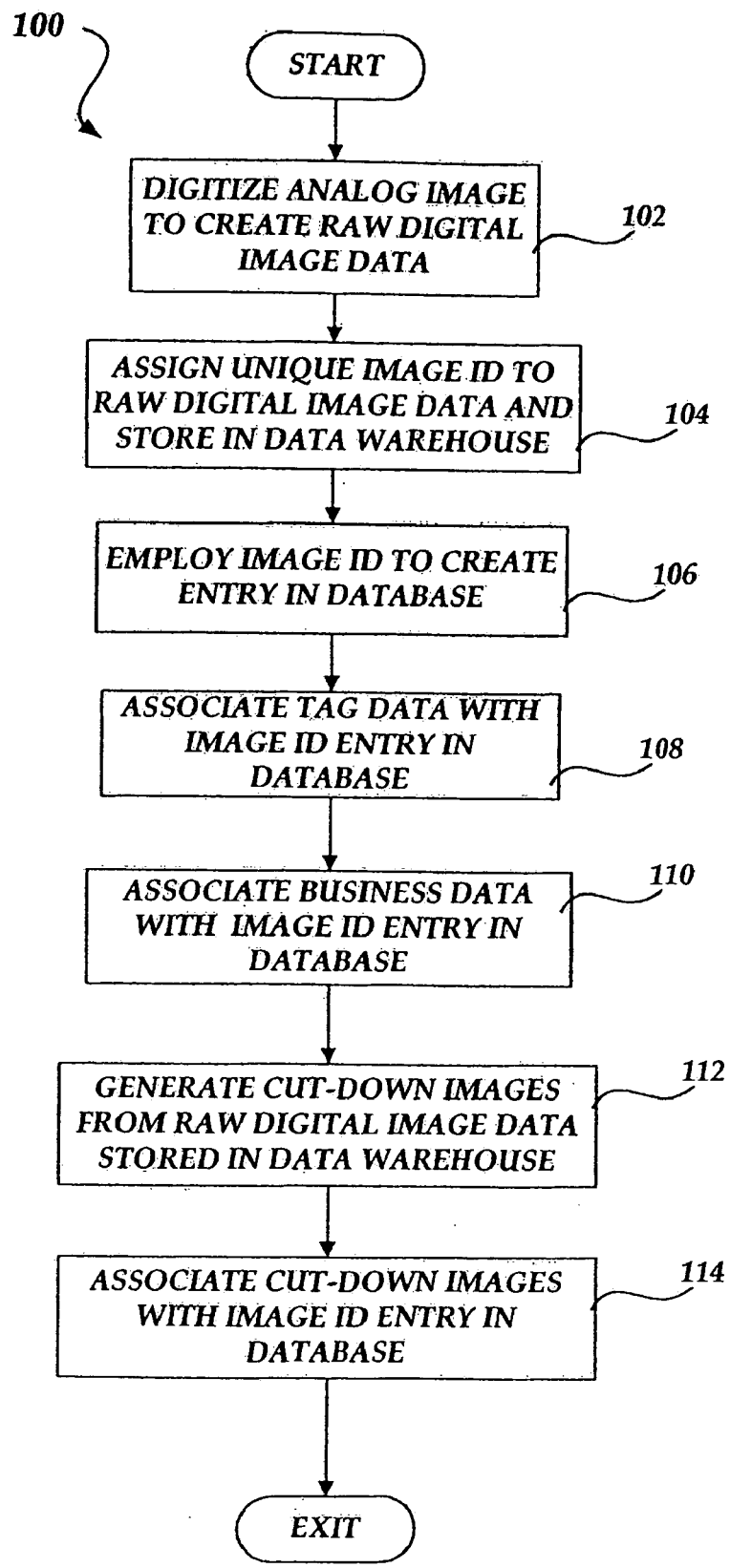
FIG. 1 shows a logical overview of the actions employed to create a relational database of images and associated data.

In FIG. 1, an overview 100 shows the logical actions for creating and storing digital data representing a copy of an original image. Moving from a start block, the logic flows to a block 102 where a digitizer is employed to generate raw binary (digital) data from a selected original image. It is envisioned that different types of digitizers, e.g., a digital camera and a scanner, could be employed to create binary image data from original images. The logic advances to a block 104 where a unique image identification number (image ID) is assigned to the raw binary image data. The image ID is employed to identify a copy of the binary image data, which is stored in a data warehouse. The logic steps to a block 106 where the image ID number is employed by a facility to create a particular entry in a relational database. In one embodiment, a third party facility such as MICROSOFT CORPORATION's SEQUEL SERVER VERSION 7.0 could be employed to create the image ID entries and manage the relational database. In yet another embodiment, another facility could be used to create and manage image ID entries in an object-oriented database.

The logic advances to a block 108 where tag data is associated with the image ID entry in the database. The tag data provides information related to the originally selected image. For example, the tag data may include the location, date, original author/photographer, name(s) of the subject(s), model release, subject matter information and title of the original image. The logic moves to a block 110 where business data is associated with the image ID entry in the database. The business data may include information identifying the source, contract, royalty, territory, contract expiration and batch number associated with the original image that is used to create the binary image data. Batch numbers are identifiers that are typically assigned to a group of original images that were purchased or licensed from a third party.

The logic flows to a block 112 where at least one cut-down digital image is generated from the binary image data. In one embodiment, several different sizes of cutdown images are created with resolutions less than the resolution of the image represented by the binary image data. For example, cut-down images that have 250 by 250, 640 by 480 and 1280 by 1024 lines of resolution could be created from binary image data representing an image with 10,000 by 10,000 lines of resolution. The logic steps to a block 114 where the cut-down image(s) are associated with the image ID entry in the database. Next, the logic flows to an exit block and terminates.

Figure 2:
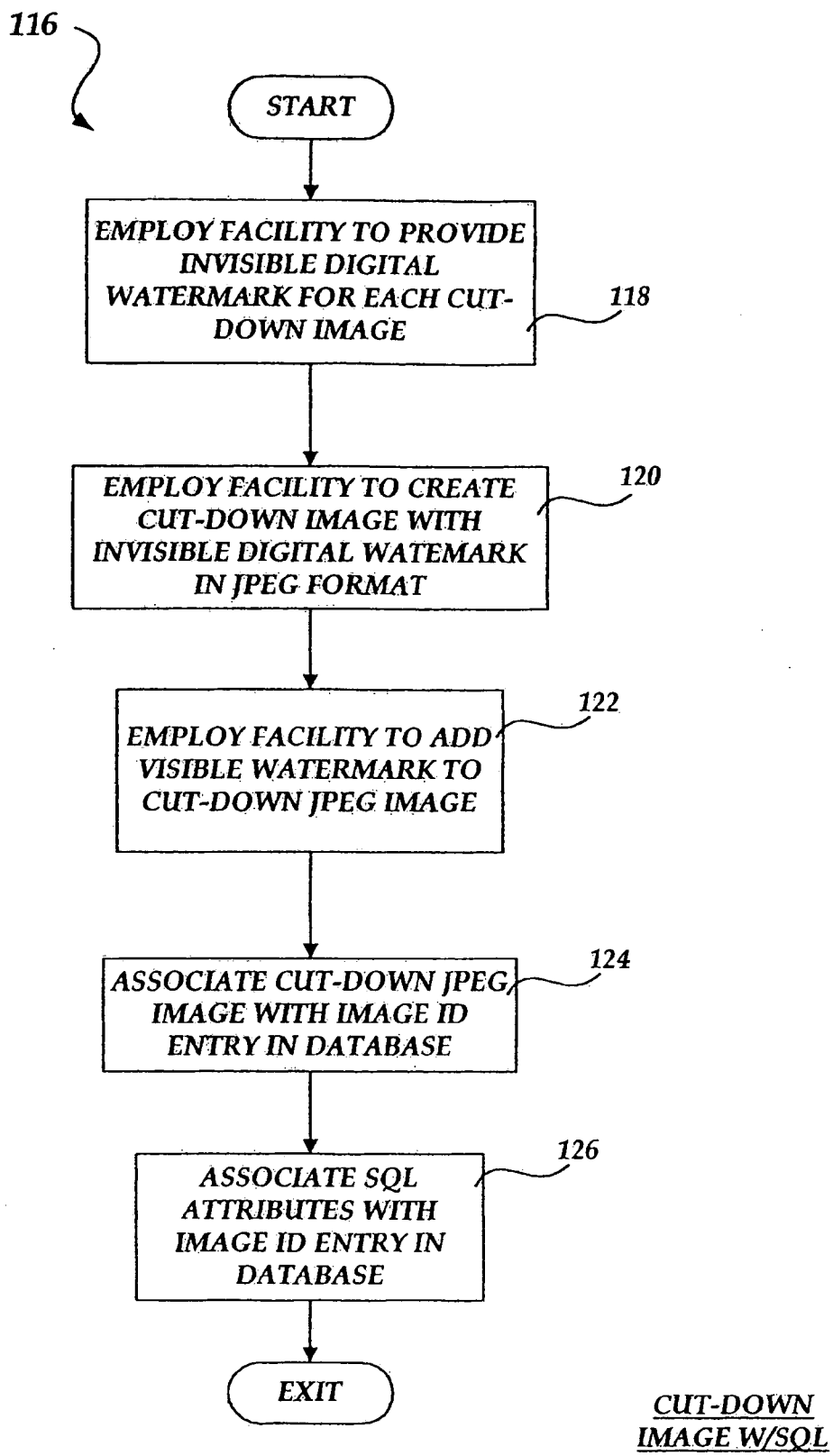
FIG. 2 illustrates a logical overview for associating an SQL attribute with a cut-down image in a relational database.

In FIG. 2, an overview 118 shows the logical actions for associating server search language (SQL) attributes with a cut-down image in a Joint Photographic Experts Group (JPEG) format that is associated with an image ID entry in a database. The logic moves from a start block to a block 118 where a facility is employed to provide an invisible digital watermark for each cut-down image. In one embodiment, a third party facility such as provided by the DIGIMARC CORPORATION may be used to create the invisible digital watermark for a cut-down image. The logic advances to a block 120 where a facility compresses each cut-down image that includes an invisible digital watermark and creates a corresponding JPEG image. Optionally, the invention may create a corresponding image in any one of a plurality of different image formats, including graphics interchange format (GIF), tag image file format (TIFF) and pictor (PIC).

The logic flows to a block 122 where a facility creates visible digital watermarks that are added to each JPEG image. The logic steps to a block 124 where the JPEG image is associated with a corresponding image ID entry in the database. The logic moves to a block 126 where SQL attributes are created and associated with the image ID entry. The SQL attributes correspond to scripts that enable particular functions for a JPEG image associated with a particular image ID entry. For example, these scripts could enable the functionality for sending, printing, and viewing a JPEG image associated with SQL attributes. Also, the scripts could enable the functionality for generating an electronic postcard, purchasing a poster, limiting the syndicated use of a JPEG image and controlling the location for displaying the JPEG image. In one embodiment, the SQL attributes are automatically generated by a facility based on the tag data and business data associated with the image ID entry. In another embodiment, the SQL attributes are manually created and associated with the image ID entry. Next, the logic moves to an exit block and terminates.

Figure 3:
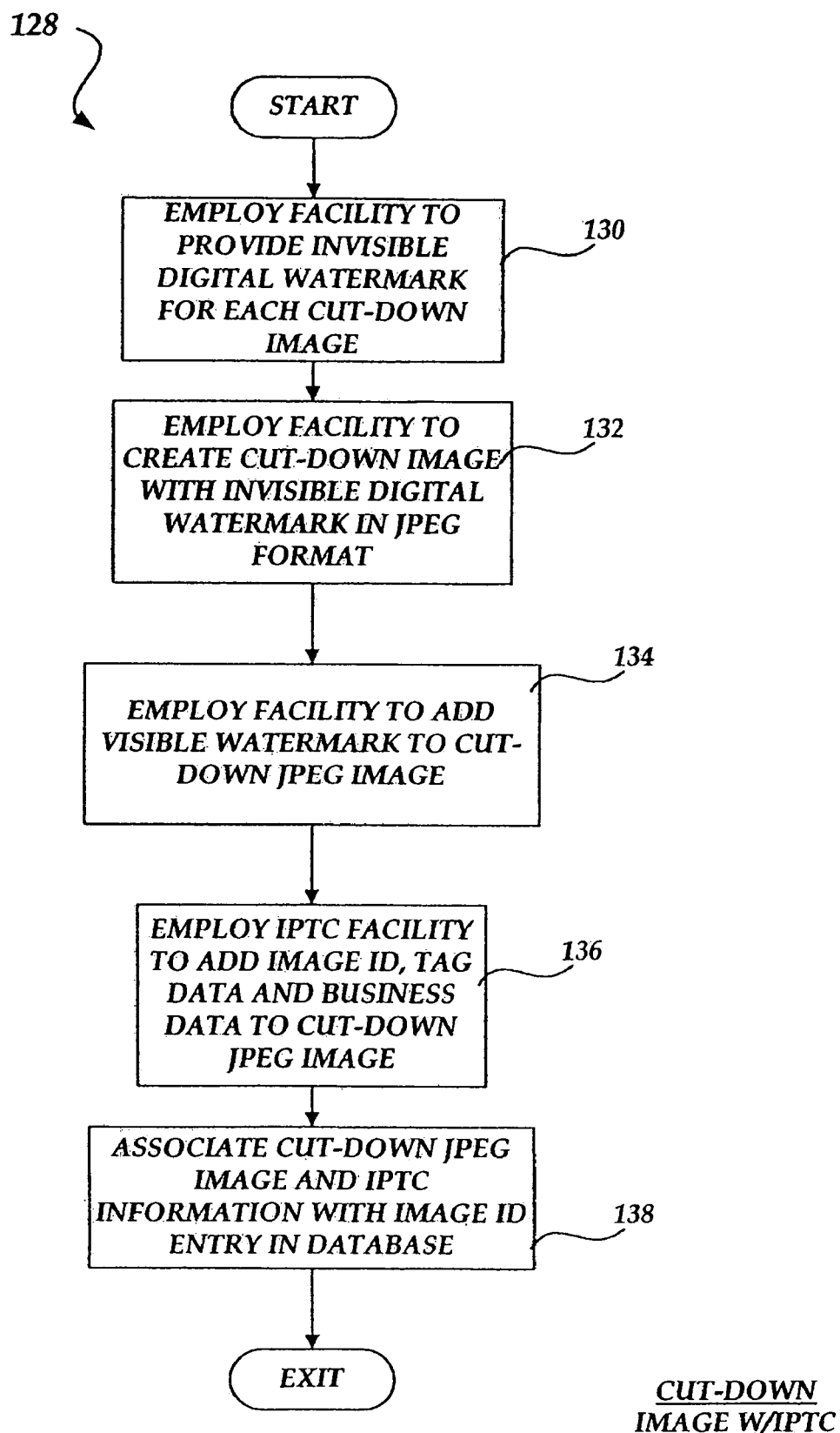
FIG. 3 shows a logical overview for associating IPTC data with a cut-down image in a relational database.

In FIG. 3, an overview 128 shows the logical actions for employing a facility to add information in an International Press and Telecommunications Council (IPTC) format to a JPEG image associated with an image ID entry in a database. The IPTC format provides a hierarchical structure for information that is added to a file containing the JPEG image.

The logic moves from a start block to a block 130 where a facility is employed to provide an invisible digital watermark for each cut-down image. The logic advances to a block 132 where a facility compresses each cut-down image with an invisible digital watermark and creates a corresponding JPEG image.

The logic flows to a block 134 where a facility creates a visible digital watermark that is added to each JPEG image. The logic steps to a block 136 where a facility is employed to generate information in an IPTC format that is added to each file containing each JPEG image. The IPTC formatted information may include the image ID, tag data and business data. Also, this information may be used to define the functionality of each JPEG image. The logic moves to a block 138 where the JPEG image that includes the IPTC formatted information is associated with the image ID entry in the database. Next, the logic jumps to an exit block and terminates.

Figure 4A:
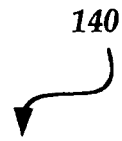
FIG. 4A illustrates a flat database file for a cut-down image associated with an SQL attribute.
Figure 4B:
FIG. 4B shows a flat database file for a cut-down image associated with IPTC data.

In FIG. 4A, an overview 140 is shown of a flat file entry in a database having fields associated with the image ID, JPEG file and SQL attributes. The presence of a "1" in a field associated with an SQL attribute indicates that this attribute's functionality is enabled for the image assigned to the image ID and the presence of a "0" indicates that the functionality is not enabled. In the exemplary embodiment, the functionality for send and electronic postcard SQL attributes are enabled and the print SQL attribute is not enabled. Additionally, FIG. 4B shows an overview 142 of a flat file entry in a database having fields associated with an Image ID and a JPEG file with IPTC information.

Logic Overview of Subject Based Search

Figure 5:
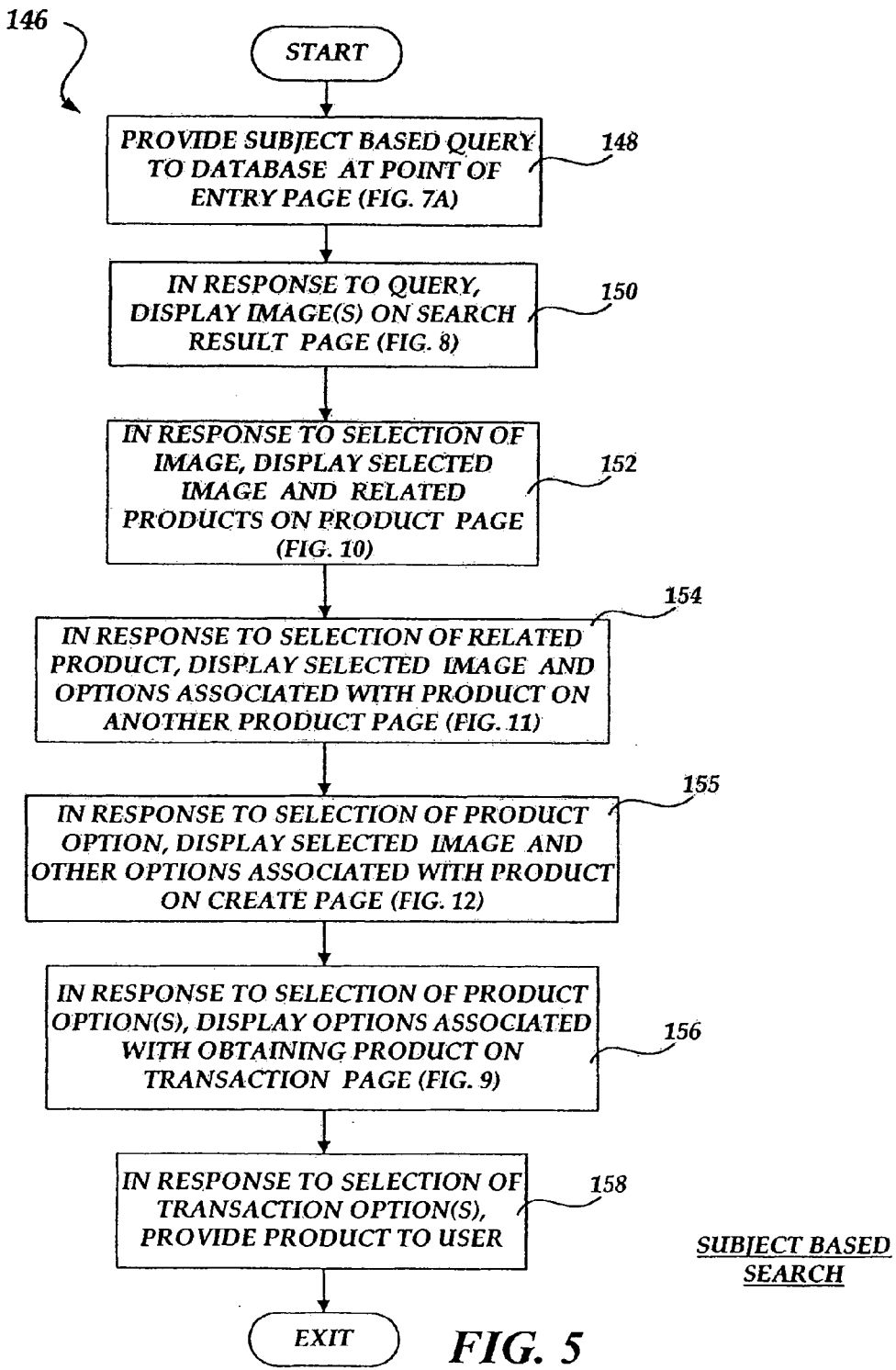
FIG. 5 illustrates a logic overview for a subject based search of a relational database.
Figure 7A:
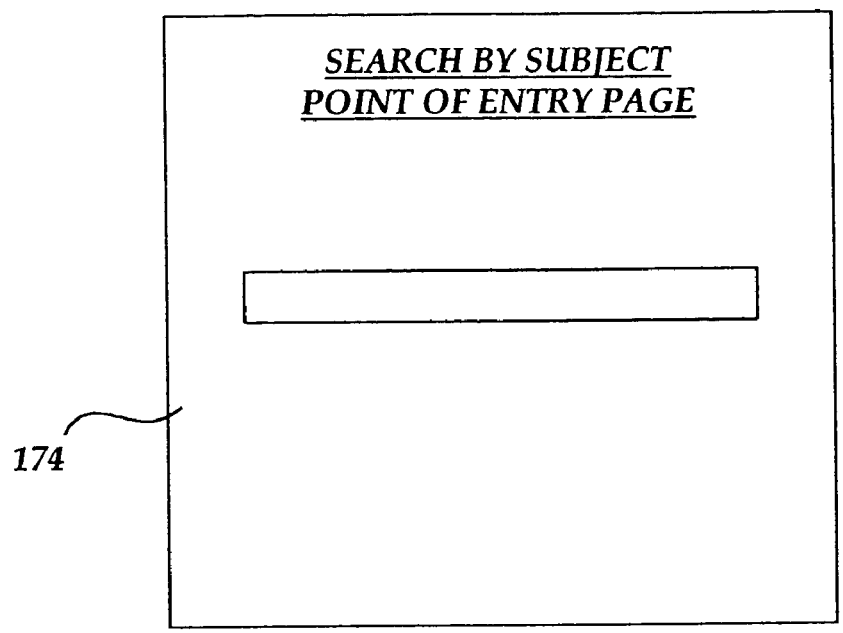
FIG. 7A illustrates an exemplary point of entry page for a subject based search of a relational database.

FIG. 5 shows an overview 146 of a subject based search to order a product associated with a selected image in a relational database. Moving from a start block, the logic steps to a block 148 where a subject based search is performed on a relational database through an interface in a point of entry page. An exemplary interface for providing a subject based search in a point of entry page 174 is shown in FIG. 7A.

Figure 8:
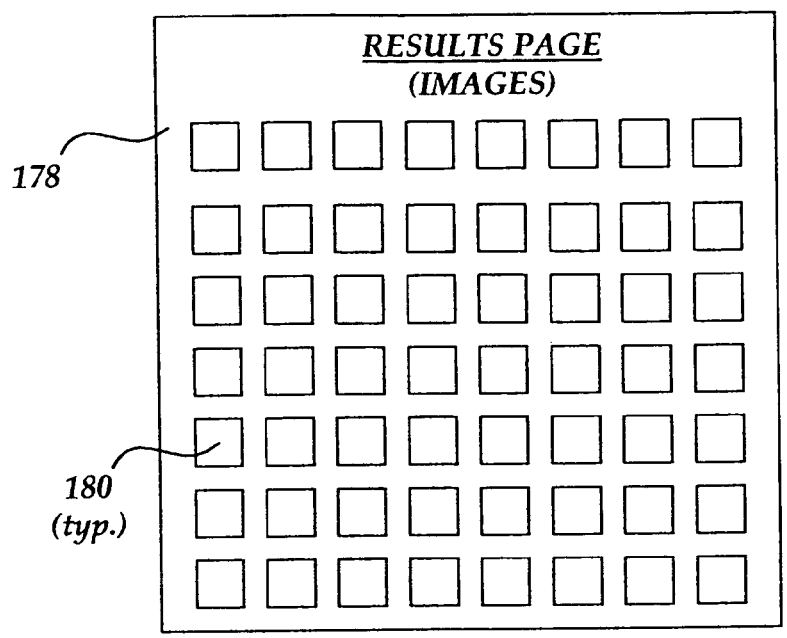
FIG. 8 illustrates an exemplary results page for a search of a relational database.

Returning to FIG. 5, the logic advances from the block 148 to a block 150 where in response to the subject search, a search engine retrieves images related to the searched subject from the relational database and displays relevant images in a search result page. FIG. 8 shows an exemplary search result page 178 with several thumbnail size JPEG images 180 that are relevant to the searched subject.

Figure 10:
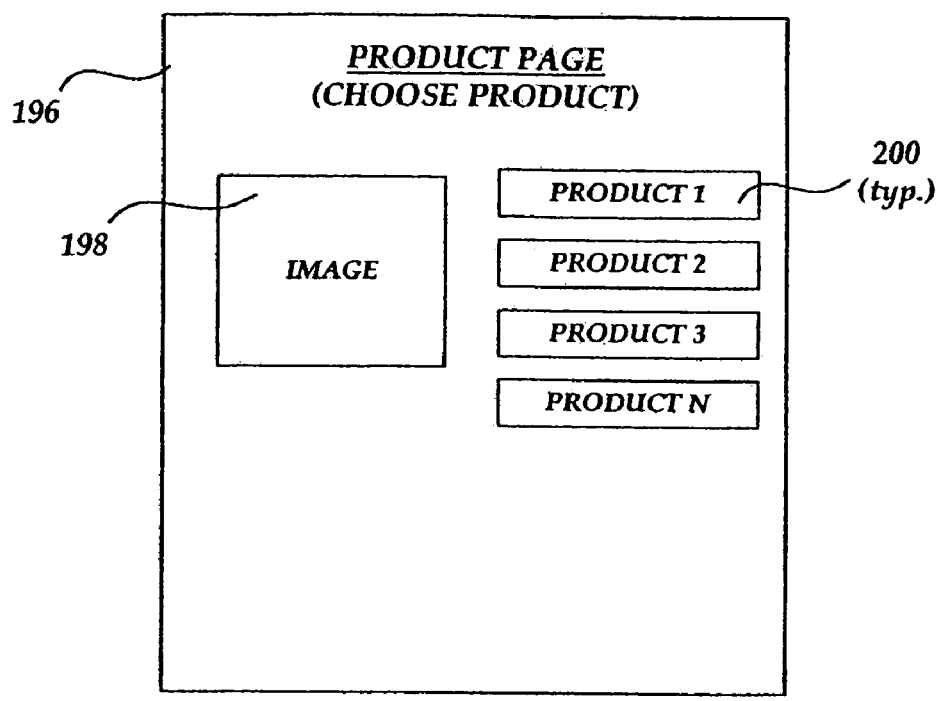
FIG. 10 illustrates an exemplary product page for choosing a product associated with an image returned from a subject based search of a relational database.

In FIG. 5, the logic flows from the block 150 to a block 152 where in response to the selection of an image in the search result page 178, a relatively larger cut-down version of the selected thumbnail JPEG image and a representation of each product available for the selected image are displayed in a product page. FIG. 10 illustrates an exemplary product page 196 that displays a relatively larger cut-down JPEG image 198 of the selected thumbnail JPEG image 180 and several graphical buttons 200 representing various products that are available for the selected image.

Figure 11:
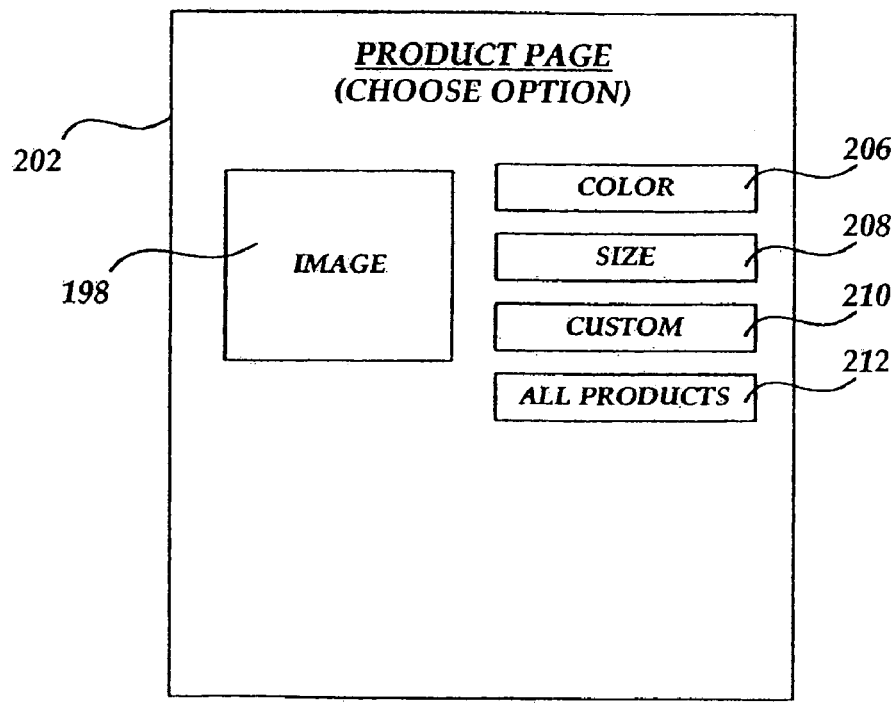
FIG. 11 shows an exemplary product page for choosing a product action associated with a product for an image returned from a product based search of a relational database.

Next, the logic steps from the block 152 to a block 154 where in response to the selection of a graphical button 200 for a product in the product page 196, the cut-down JPEG image 198 and several product options are displayed in another product page. FIG. 11 illustrates another exemplary product page 202 that displays the cut-down JPEG image 198 of the selected image and several graphical buttons representing product options, including: (1) a color button 206 for selecting the color of the chosen product; (2) a size button 208 for selecting the size of the selected product; (3) a custom button 210 for customizing an action for the selected product; and (4) a show all button 212 for causing the display of all of the product options available for a chosen product.

Figure 12:
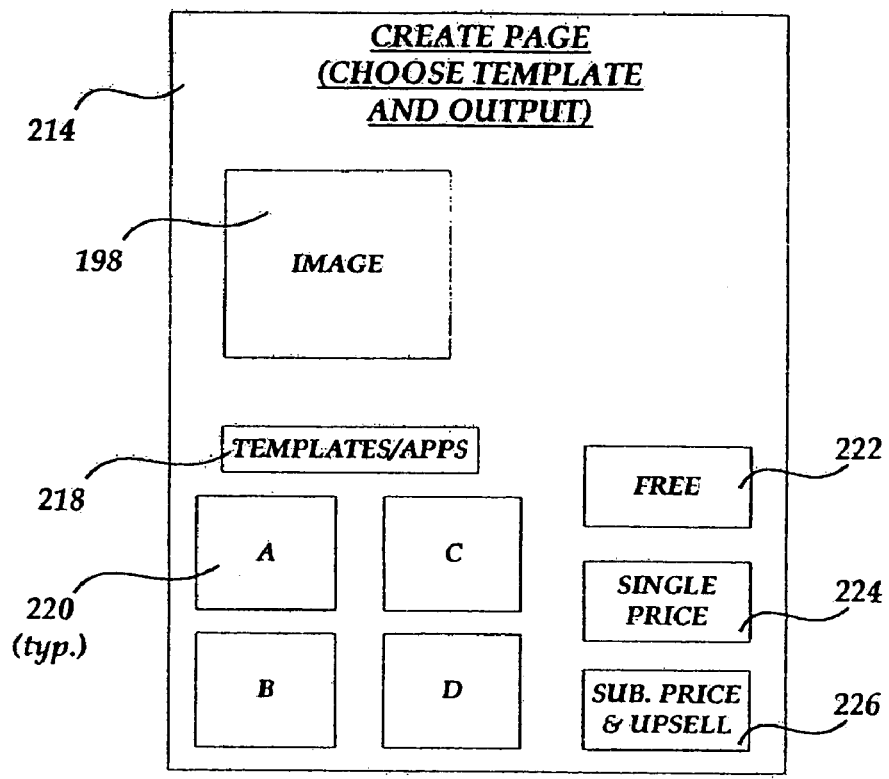
FIG. 12 illustrates an exemplary create page for choosing the output for a selected product.

In response to the selection of a product option displayed in the other product page 202, the logic moves to a block 155 where the cut-down JPEG image 198 and other product options are displayed in a create page. In FIG. 12, an exemplary create page 214 is shown with the other product options represented by graphical buttons. These buttons include (1) a template button 218 for selecting any of several product templates 220; (2) a free button 222 for enabling a copy of the selected product to be ordered for free; (3) a single price button 224 for purchasing an individual copy of the selected product; and (4) a subscription price/upsell button 226 for a subscribing user to order the selected product with the ability to sell (upsell) the selected product to others.

The actual cost of the related product for a selected image would be influenced by the configuration of the image within the product template. For example, small image resolutions might be given away for free with some products such as thumbnail image with 150 by 150 lines of resolution. Alternatively, larger image resolutions, e.g., 5 640 by 480 lines of resolution and above, would cause a related product such as a screen saver to cost $5.00 or more.

Figure 9:
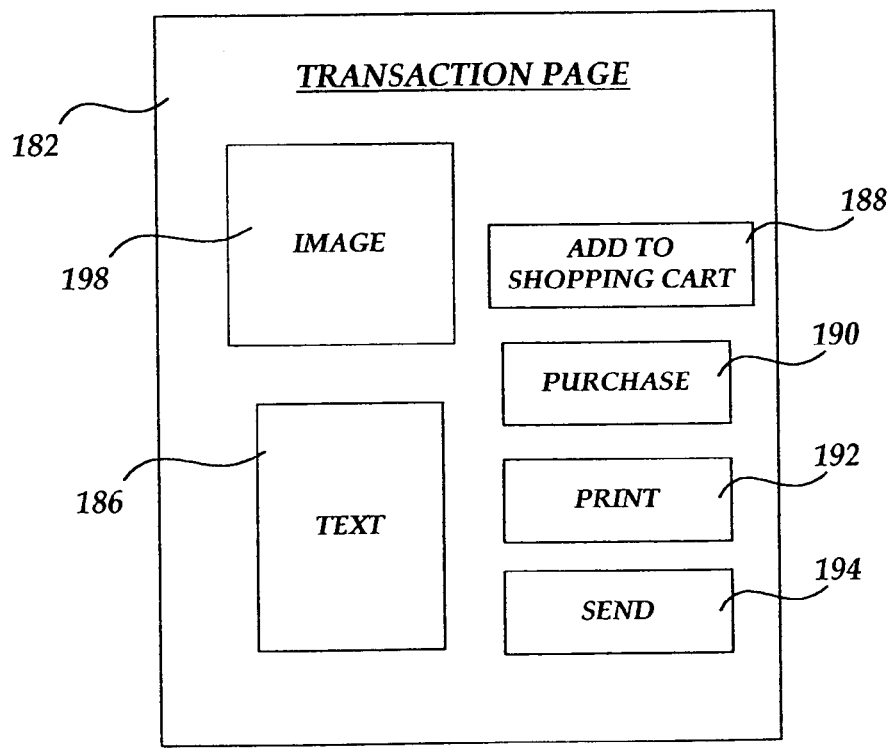
FIG. 9 shows an exemplary transaction page for a search of a relational database.

Returning to FIG. 5, the logic steps from the block 155 to a block 156 where in response to the selection of a button in the create page, the cut-down JPEG image 198 and several transaction options are displayed in a transaction page. FIG. 9 illustrates an exemplary transaction page 182 with descriptive text 186 and several transaction options that are represented by graphical buttons. These buttons include (1) an add button 188 for adding the selected product to a virtual shopping cart for later purchase; (2) a purchase button 190 for enabling the purchase of the selected product; (3) a print button for printing the selected product such as a calendar or poster; and (4) a send button for enabling the selected product to be sent to another user.

In FIG. 5, the logic moves from the block 156 to a block 158 where in response to the selection of a graphical button in the transaction page, the particular transaction option associated with the selected button is performed. For example, when the purchase button is selected, a transaction is initiated with an electronic commerce server to facilitate the purchase of the selected product. Next, the logic steps to an exit block and terminates.

Figure 13:
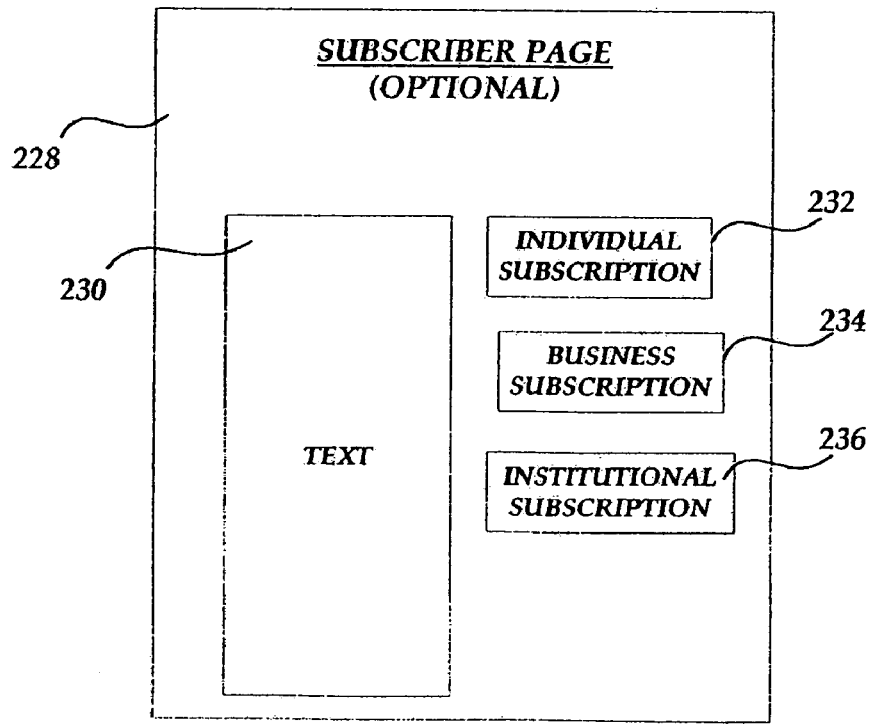
FIG. 13 shows an exemplary subscription page for enabling a user to select a subscription to a relational database of images.

Optionally, it is envisioned that a subscriber page could be displayed for enabling a user to subscribe to a service that enables various types of uses for selected images and products. In FIG. 13, an exemplary subscriber page 228 illustrates text 230 and graphical buttons. The text 230 may be used to describe the benefits of subscription. The graphical buttons include: (1) an individual subscription button; (2) a business subscription button; and (3) an institutional (educational/non-profit organization) subscription. Although not shown, when a user's subscription has expired, the invention can display an "expired subscription" button in the subscriber's page. The selection of this button would cause a renewal page (not shown), which would enable the user to renew and/or modify their expired subscription.

Additionally, the invention enables updated information related to new products and images to be "pushed" (sent) to a subscriber. Also, the invention enables the presentation of available images and related products to be customized according to the type of subscription that a user has purchased/selected.

Logic Overview of Product Based Search

Figure 6:
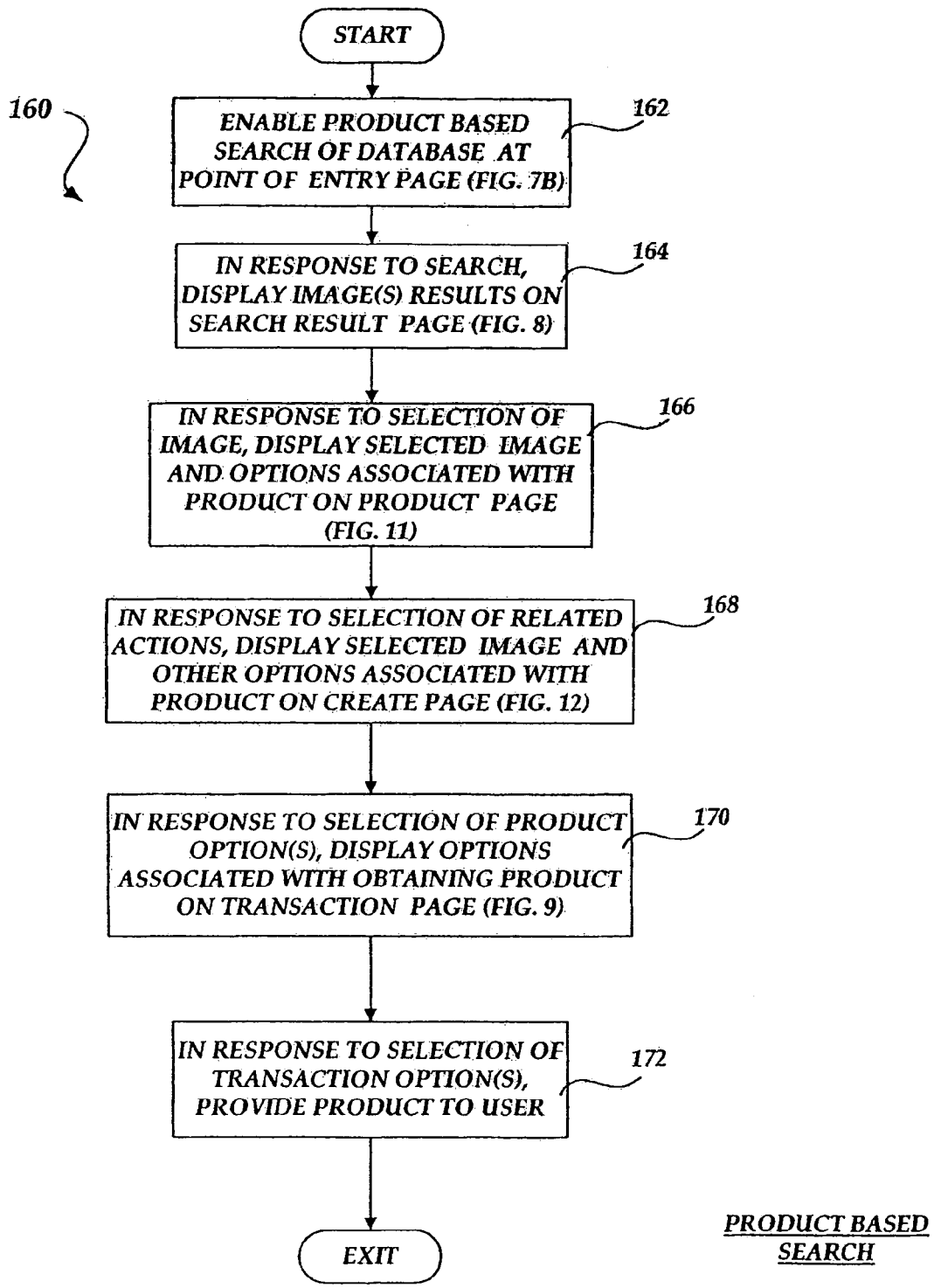
FIG. 6 shows a logic overview for a product based search of a relational database.
Figure 7B:
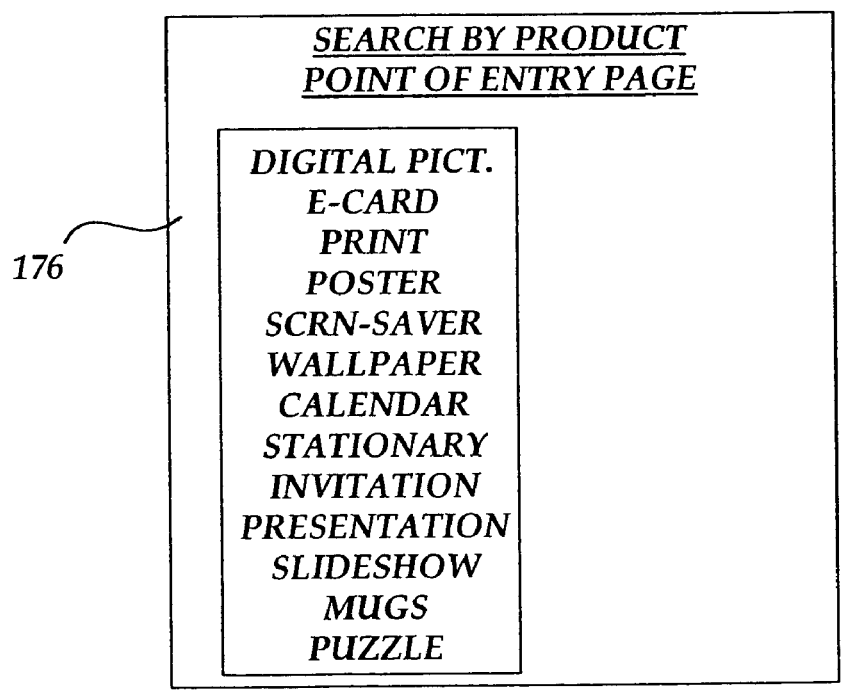
FIG. 7B shows an exemplary point of entry page for a product based search of a relational database.

FIG. 6 shows an overview 160 of the logical actions performed in a product based search for ordering a selected product that is associated with an image in a relational database. Moving from a start block, the logic steps to a block 162 where a product based search is performed on the relational database through an interface in a point of entry page. An exemplary interface for providing a product search in a point of entry page 176 is shown in FIG. 7B.

Returning to FIG. 6, the logic advances from the block 162 to a block 164 where in response to the product search, JPEG images that can be provided with the searched product are returned from the relational database and displayed in a search result page. FIG. 8 shows an exemplary search result page 178 with several thumbnail JPEG images 180 that can be provided with the searched product.

In FIG. 6, the logic flows from the block 164 to a block 166 where in response to the selection of an image in the search result page 178, the cut-down image and several graphical buttons representing other product options are displayed in the other product page. As discussed above, FIG. 11 illustrates an exemplary embodiment of the other product page 202. The logic steps from the block 166 to a block 168 where in response to the selection of one of the graphical buttons in the other product page 202, the cut-down JPEG image 198 and several options for the product are displayed in the create page. As discussed above, FIG. 12 illustrates the exemplary create page 214 which includes several graphical buttons that represent other product related options. Looking to FIG. 6, the logic steps from the block 168 to a block 170 where in response to the selection of a button in the create page, the cut-down JPEG image 198 and several options are displayed in a transaction page. An exemplary transaction page 182 is discussed above and shown in FIG. 9.

In FIG. 6, the logic moves from the block 170 to a block 172 where in response to the selection of a button in the transaction page, the particular option associated with the selected button is performed. Next, the logic steps to an exit block and terminates.

Persistent Client Identification With HTTP Cookie

HTTP is an application level protocol typically used for transferring data across the Internet, e.g., a network data object or server, and it can be specified in a Uniform Resource Locator (URL) address that is provided to a browser program. The Hyper Text Mark-up Language (HTML) is a simple data format that is used to create hypertext documents that are supported by the HTTP protocol. Together, HTTP and HTML have significantly contributed to the creation of the World Wide Web (WWW) on the Internet. The WWW is a globally accessible and platform-independent hypermedia information system that has become a central access point to applications and services for users around the world.

A Cookie is a general mechanism, i.e., protocol, which server side connections can use to both store and retrieve information on the client side of the connection. The addition of a simple, persistent, client-side state significantly extends the capabilities of Internet-based client/server application programs. A server, when returning a HTTP object to a client, may also send a piece of state information which the client may store. Included in that state object is a description of the range of Uniform Resource Locators (URLs) for which the returned state is valid. Any future HTTP requests made by the client which fall in that range will include a transmittal of the current values of the state object from the client back to the sender. This state object is called a "Cookie," for no compelling reason.

The Cookie mechanism provides a powerful tool that enables different types of application programs to be written for Internet-based environments. For example, a service program could use a Cookie to send back registration information and free the client from retyping a user identification number for each connection to the service.

Also, an Internet site could store user preferences for a client and have the client supply those preferences each time that the client connected to the site.

Generally, a Cookie is introduced to the client by including information with a Set-Cookie command in a header as part of an HTTP response. An example of the SetCookie command included in an HTTP response header is listed below.

<HEADER>
Set-Cookie: NAME=VALUE; expires=DATE; path=PATH, domain=DOMAIN
NAME; secure
</HEADER>

When a client's browser program is requesting resources at a particular URL address from an HTTP server on the Internet, the browser will match the requested URL against all of the URLs stored in the client's Cookies. If the requested URL matches any of the stored URLs, a line containing the name/value pairs of all matching Cookies will be included in the HTTP request. An exemplary line in a Cookie for an HTTP request could be included as follows:
Cookie: NAME1=OPAQUE STRING1, NAME2=OPAQUE STRING2.

A Cookie is typically used to save the state of a relationship between a client and a server with a unique client identifier. However, in some cases, the saved state of the relationship or Cookie may be deleted by the client and/or not persistently stored. For example, the client may employ a Cookie management program that automatically deletes stored Cookies after each client-server session or does not allow a server to provide a Cookie to the client. Unfortunately, if the client does not have a previously stored Cookie when it makes repeated HTTP requests of a server, the server may not initially recognize that a repeat client is participating in the current session.

Since saving a state relationship in a Cookie at a client can be a problem, the invention can also monitor the behavior of an unknown or new client to determine if the new client is actually a repeat client that did not retain a Cookie previously provided in an HTTP response. For example, when the new client enters identifying information in a point of entry page for a new client, the invention will compare this information to other information previously stored in client profiles to determine if the new client is actually a repeat client. Also, when the new client purchases a product, the invention will compare a new client's financial transaction information to previously stored information in each client profile in order to identify a repeat client.

The invention creates a temporary client identifier for each new client that starts a session with a server. The temporary user identifier is sent to the client in a Cookie that is included in an HTTP response during the session. However, if the new client is determined to actually be a repeat client during the session, then an HTTP response that includes a Cookie with a copy of a previously assigned permanent client identifier for the repeat client is sent to the repeat client during the session. Alternatively, if the new client is not determined to be a repeat client by the end of a session, the invention will send an HTTP response with a Cookie to store a copy of a newly assigned permanent client identifier which will replace the copy of the temporary client identifier stored at the client.

Additionally, as the number of repeat client sessions increase, the invention provides an increasingly customized user interface. The invention employs the permanent client identifier to persistently store in an associated client profile the historical behavior information associated with a repeat client's behavior for each session, e.g., the topic of each search and each purchased product. The invention employs a client profile to customize the presentation of a graphical user interface such as a point of entry page with particular features and products related to the repeat client's preferences.

In FIG. 14A, an exemplary HTTP request 238 with a Cookie that includes a permanent client identifier is shown. FIG. 14B illustrates an exemplary HTTP request 240 without a Cookie identifying the client. FIG. 14C shows an exemplary HTTP response 242 with a Cookie that includes a temporary client identifier. FIG. 14D illustrates an exemplary HTTP response 244 with a Cookie that includes a permanent client identifier.

It is envisioned that other methods may be employed to provide a persistent identifier for a client. Querystring parameters are another means of persisting a client's identity cross many pages. For example, when a dynamic link is selected on a first page, this page could read in a client's identifier and append the identifier to a query string for the URL in the link. A following page would be able to read the URL's appended namevalue pair (client identifier) for determining the client's identity.

Additionally, it is envisioned that a client-side application program could be downloaded from a server that would work in conjunction with a browsing facility. This client-side application program could send the client's identifier to a server as necessary to persistently identify the client.

System Overview

Figure 15:
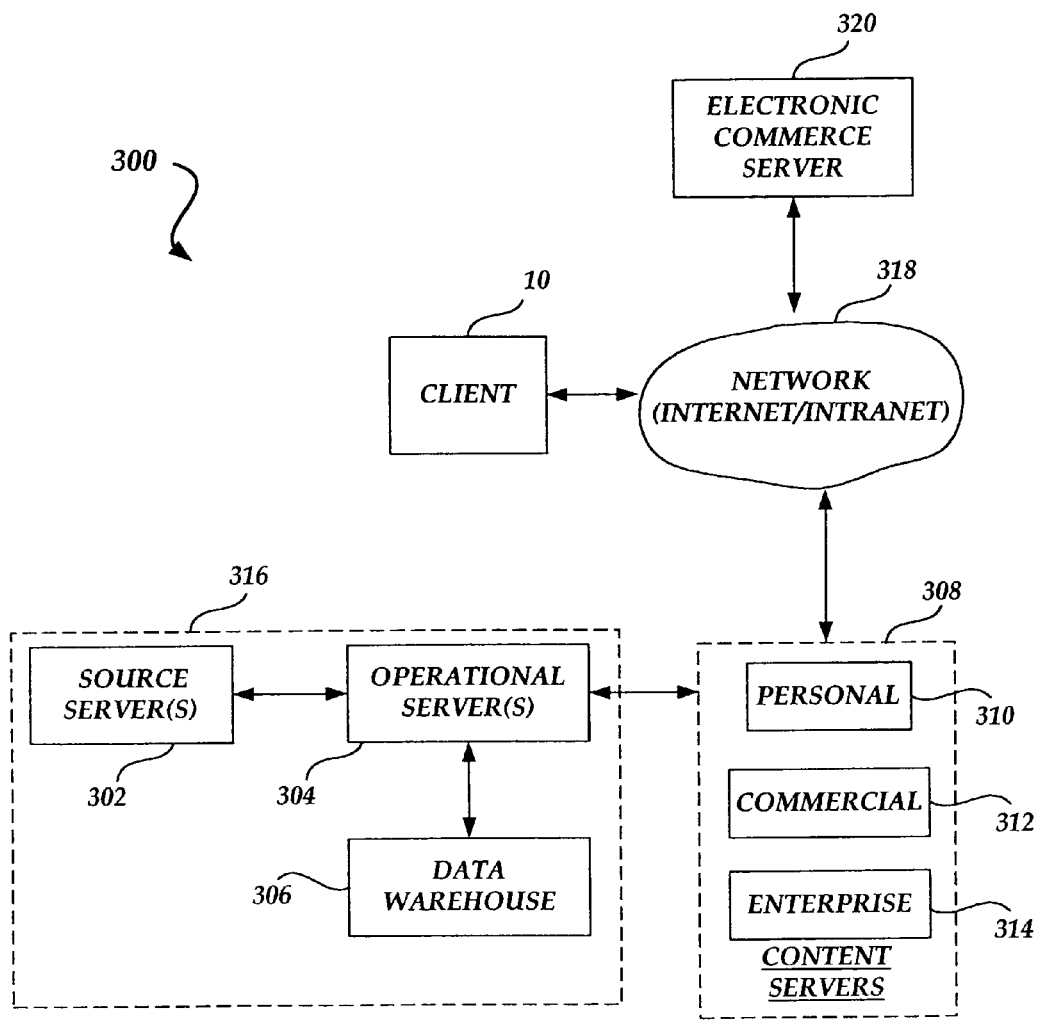
FIG. 15 illustrates a system overview for data centers with servers that are remotely located from a client.

In FIG. 15, an overview 300 illustrates an exemplary system for acquiring and storing a digitized image and enabling the functionality of a selected image. At a data center 316, a source server 302 can be employed to digitize an original image and store a copy of the digitized image as binary data. As discussed in greater detail above, JPEG images are created and stored in at least one relational database (not shown) which can be accessed by an operational server 304. Although not shown at the data center 316, a facility may be provided for removing artifacts that degrade the quality of an image generated from the binary image data. It is envisioned that at least a portion of the artifact removal process could be performed automatically. The raw binary image data is stored in a data warehouse server 306 that may be local or (optionally) remotely located from the data center 316.

At another data center 308, a personal content server 310, a commercial, content server 312, an enterprise content server 314 and another relational database (not shown) are disposed. The image data stored in the other relational database at the other data center 308 mirrors the image data stored in the relational database at the data center 316, which are coupled to each other by a network. The content servers enable the functionality of the invention for a particular type of client, i.e., personal, commercial and enterprise. At predetermined intervals, the content of the other relational database at the other data center 308 can be updated with the most recent image ID entries in the relational database at the data center 316. It is understood that the disposition of relational databases with mirrored entries at two separate data centers provides significant fault tolerance and image data redundancy. A client 10, the data centers 308 and 316 and an electronic commerce server 320 are coupled to each other over a wide area network 318 such as the Internet.

Figure 16:
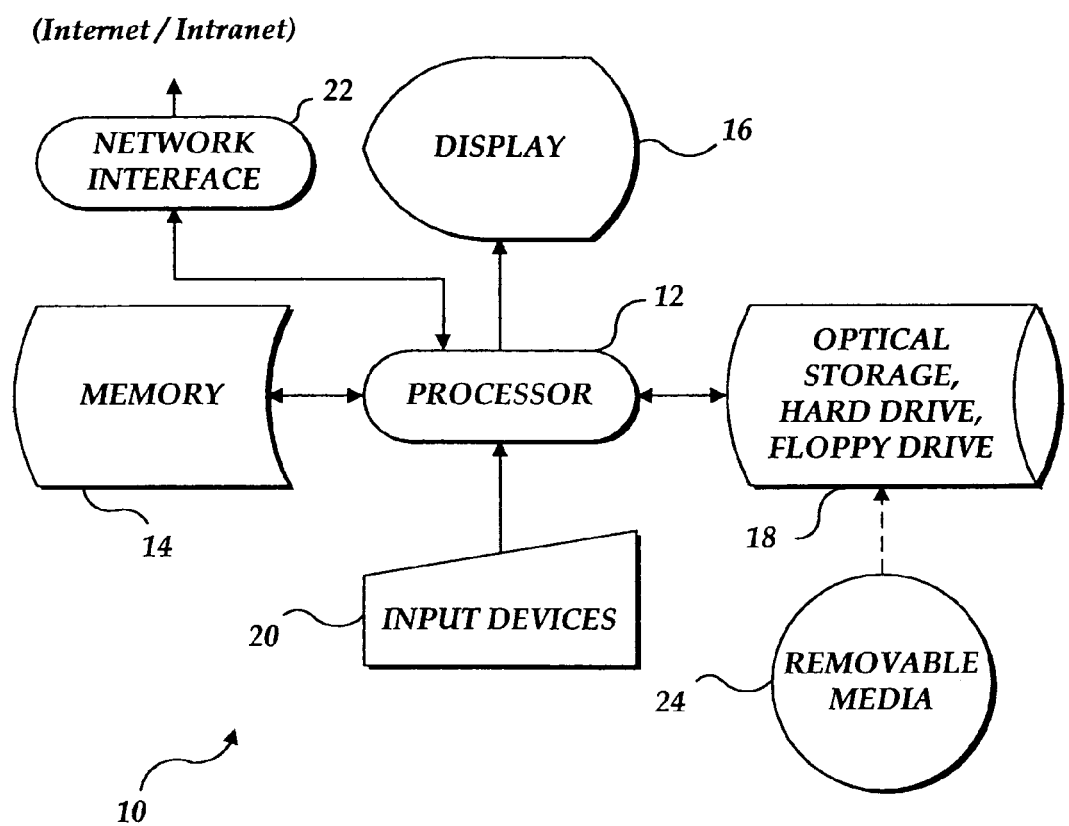
FIG. 16 shows an exemplary computer system for a client.

FIG. 16 illustrates a system for the client 10 comprising components of a computer suitable for executing an application program embodying the present invention. In FIG. 16, a processor 12 is coupled bi-directionally to a memory 14 that encompasses read only memory (ROM) and random access memory (RAM). ROM is typically used for storing processor specific machine code necessary to bootup the computer comprising client 10, to enable input and output functions, and to carry out other basic aspects of its operation. Prior to running any application program, the machine language code comprising the program is loaded into RAM within memory 14 and then executed by processor 12. Processor 12 is coupled to a display 16 on which the visualization of the HTML response discussed above is presented to a user. Often, programs and data are retained in a nonvolatile memory media that may be accessed by a compact disk-read only memory (CD-ROM) drive, compact disk-read/write memory (CD-R/W) drive, optical drive, digital versatile disc (DVD) drive, hard drive, tape drive and floppy disk drive, all generally indicated by reference numeral 18 in FIG. 16. A network interface 22 couples the processor 12 to a wide area network such as the Internet.

As noted above, the invention can be distributed for use on the computer system for the client 10 as machine instructions stored on a memory media such as a floppy disk 24 that is read by the floppy disk drive. The program would then typically be stored on the hard drive so that when the user elects to execute the application program to carry out the present invention, the machine instructions can readily be loaded into memory 14. Control of the computer and selection of options and input of data are implemented using input devices 20, which typically comprise a keyboard and a pointing device such as a mouse (neither separately shown). Further details of system for the client 10 and of the computer comprising it are not illustrated, since they are generally well known to those of ordinary skill in the art.

Overview of Artificial Intelligence Engine Logic and Architecture

Figure 17:
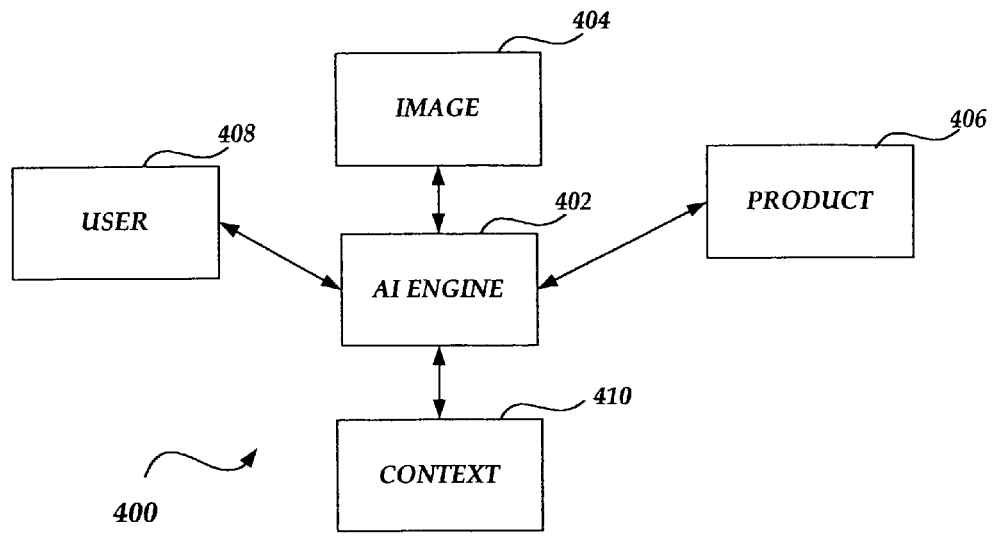
FIG. 17 illustrates an architectural overview of the objects referenced by an artificial intelligence engine.

FIG. 17 illustrates an overview 400 of the object-oriented architecture for implementing the invention with a rules based artificial intelligence engine 402. The engine 402 interfaces with an image object 404 that provides access to image metadata, e.g., image properties, image usage rights and special products available for use with the image. A product object 406 also interfaces with the engine 402. The product object 406 may provide the engine 402 with access to business preference data such as product properties and configuration options. The engine 402 interfaces with a user object 408 that can provide access to user metadata including user rights, behavior (historical), preferences and subscription status. Additionally, the engine 402 interfaces with a context object 410 that provides contextual interaction data including: (1) the type of viewer employed to access a page displaying images and related products such as a browser or digital canvas; (2) from what place in a web site that a user accessed the invention, e.g., a home page, special interest page, subscriber page or third party web site page; and (3) from what interaction in a web site that a user accessed the invention, e.g., a search, browse, or click through from a hyperlinked object.

The engine 402 employs the different types of data provided by the image object 404, product object 406, user object 408 and context object 410 to perform a rules based (artificial intelligence) analysis for determining which images and related products will be displayed in a page. In this way, the invention enables a customized display of images and related products to be provided for each user.

Figure 18:
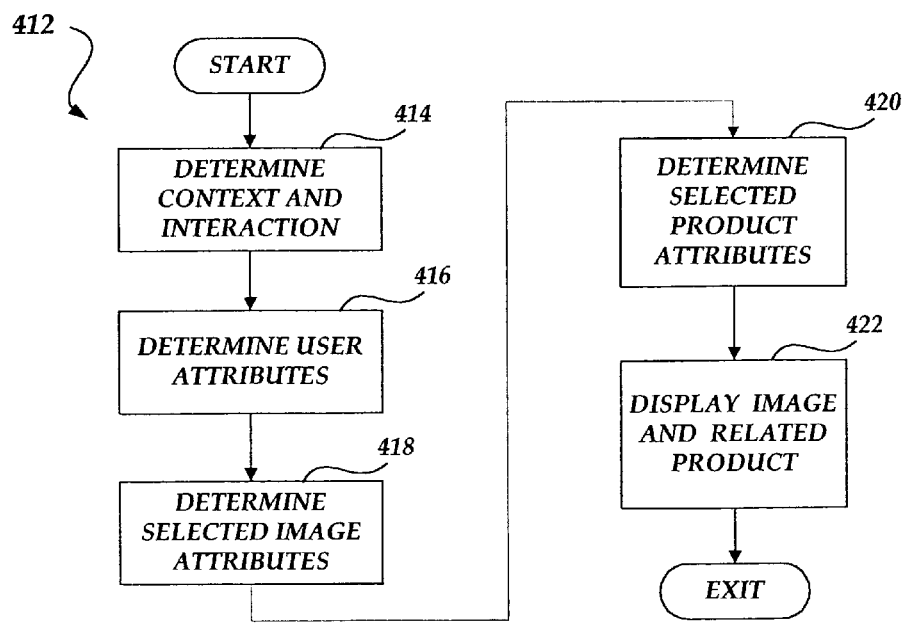
FIG. 18 shows a flow chart representing the logic employed by the artificial intelligence engine to generate the display of the image and related product.

In FIG. 18, a flow chart 412 illustrates a logical overview for analyzing which images and related products will be displayed in a page to a user. Moving from a start block, the logic advances to a block 414 where the contextual interaction of a user with the invention is analyzed, such as type of viewing program, hierarchical position of a user in a web site, search criteria, browsing results and hyperlinked click throughs. The logic steps to a block 416 where the logic determines the particular attributes of the current user, including rights, behavior, preferences and subscription status of the user. Advancing to a block 418, the logic determines the image attributes of the selected image, including properties, usage rights and special related products. The logic flows to a block 420 where the logic determines the attributes of the selected product that is related to the selected image. For example, the logic determines the properties and options for the selected product. Moving forward, the logic advances to a block 422 where the logic employs artificial intelligence (rules based analysis) to generate a display of the images and related products. Also, the logic can employ the category of the image and the actual use of the image to generate a display of the images and products. Next, the logic steps to an exit block and the logic flow terminates.

In another embodiment, an agent program (not shown) may be employed to automatically search a relational database to select an image and/or procure a related product in accordance with a user request. The agent program may be associated with an electronic appliance/device that enables the program to select an image and/or product from any one of multiple relational databases on a network. The user can employ the agent program to automatically choose an image and/or product based on different criteria including theme, category, context and subject. The agent program may be configured to automatically search at least one network and gather certain types of information in the background.

Although subject based and product based searches are discussed above, in another embodiment a sound based search and/or a video based search may be performed in substantially the same way when the relational database of image data also includes sound and/or video data. The sound data may be provided in any one of several formats, including Motion Picture Expert Group Version 3 (MPEG 3 or MP3) and WAV. Also, the video data can be provided in any one of several formats, including MPEG, QuickTime (QTM) and Audio Video Interleaved (AVI). In other embodiments, the invention can store video data or sound data instead of image (picture) data in the relational database. In either case, storing the sound/video data and the associated information in the relational database, creating relational database sound/video ID entries, and subject and product based searching would be performed in substantially the same manner as discussed above for a relational database that did include image ID entries and image (picture) data.

While the preferred embodiment of the invention has been illustrated and described, it will be appreciated that various changes can be made therein without departing from the spirit and scope of the invention.

What is claimed as new and desired to be protected by Letters Patent of the United States is:

1. A method for displaying a product associated with a media object, comprising:
    in response to a selection of the media object by a current user, displaying at least one product that is available for use with the media object;
    assigning a temporary identifier to a current user;
    if the current user is determined to be a repeat user, the repeat user having a previously-assigned permanent identifier, adding behavior information relating to the current user to a previously-stored profile associated with the repeat user, and changing the temporary identifier to the permanent identifier assigned to the repeat user; and
    if the current user is determined to be a new user, storing the behavior information relating to the current user in a new profile associated with the current user, and changing the temporary identifier to a new permanent identifier assigned to the current user.

2. The method of claim 1 wherein at least one of the previously-assigned permanent identifier, the newly-assigned permanent identifier, and the temporary identifier is included with a cookie.

3. The method of claim 1 wherein at least one of the previously-assigned permanent identifier, the newly-assigned permanent identifier, and the temporary identifier is included with a querystring parameter.

4. The method of claim 1 wherein the media object is one of an image object, an audio object, and a video object.

5. A computer-readable medium for displaying a product associated with a media object, having a plurality of components that include computer-executable instructions for causing a computer to perform actions, comprising:
    a first component for causing the display of at least one product that is available for use with the media object in response to a selection of the media object by a current user;
    a second component for causing the assignment of a temporary identifier to the current user;
    a third component for causing the addition of behavior information relating to the current user to a previously-stored profile associated with a repeat user, and causing the change of the temporary identifier to a permanent identifier previously-assigned to the repeat user in response to a determination that the current user is determined to be the repeat user, and
    a fourth component for causing the storage of the behavior information relating to the current user in a new profile associated with the current user, and causing the change of the temporary identifier to a new permanent identifier assigned to the current user in response to a determination that the current user is a new user.

6. A method for displaying information regarding a product associated with a media object, comprising:
    displaying to a current user, based on an interaction context, a selectable representation of the media object and a selectable representation of at least one product that is available for use with the media object, wherein the display of each product that is unavailable for use with the media object is suppressed;
    if the current user is determined to be a repeat user, the repeat user having a previously-assigned permanent identifier, adding behavior information relating to the current user to a previously-stored profile associated with the repeat user, and changing a temporary identifier for the current user to the permanent identifier assigned to the repeat user; and
    if the current user is determined to be a new user, storing the behavior information relating to the current user in a new profile associated with the current user, and changing the temporary identifier to a new permanent identifier assigned to the current user.

7. The method of claim 6 wherein the media object is one of an image object, an audio object, and a video object.

8. The method of claim 6 wherein at least one of the previously-assigned permanent identifier, the newly-assigned permanent identifier, and the temporary identifier is included with a cookie.

9. The method of claim 6 wherein at least one of the previously-assigned permanent identifier, the newly-assigned permanent identifier, and the temporary identifier is included with a querystring parameter.

10. The method of claim 6, further comprising retrieving the media object from a database of media object records.

11. The method of claim 6, further comprising customizing presentation of the media object and the product in accordance with a service subscription.

12. A computer-readable medium for displaying information regarding a product associated with a media object, having a plurality of components that include computer-executable instructions for causing a computer to perform actions, comprising:

a first component for causing a display to a current user, based on an interaction context, a selectable representation of the media object and a selectable representation of at least one product that is available for use with the media object, wherein the display of each product that is unavailable for use with the media object is suppressed;

a second component for causing the addition of behavior information relating to the current user to a previously-stored profile associated with a repeat user, and causing a change from a temporary identifier for the current user to a permanent identifier assigned to the repeat user if the current user is determined to be the repeat user, and a third component for causing the storage of behavior information relating to the current user in a new profile associated with the current user, and causing another change from the temporary identifier to a new permanent identifier assigned to the current user in response to a determination that the current user is a new user.

13. A method for displaying information regarding a product associated with a media object, comprising:

performing a rules-based analysis of user interaction data and a plurality of attributes associated with a current user, the media object, and the product to generate a display that includes at least one representation of the media object and at least one product that is available for use with the media object;

if the current user is determined to be a repeat user, the repeat user having a previously-assigned permanent identifier, adding behavior information relating to the current user to a previously-stored profile associated with the repeat user, and changing a temporary identifier for the current user to the permanent identifier assigned to the repeat user; and if the current user is determined to be a new user, storing the behavior information relating to the current user in a new profile associated with the current user, and changing the temporary identifier to a new permanent identifier assigned to the current user.

14. The method of claim 13 wherein the media object is one of an image object, an audio object, and a video object.

15. The method of claim 13 wherein the attributes include a user attribute comprising one of user rights, user behavior, user preferences, and user subscription status.

16. The method of claim 13 wherein the attributes include a media object attribute comprising one of media object properties and media object usage rights.

17. The method of claim 13 wherein the attributes include a product attribute comprising one of a product property and a product option.

18. A computer-readable medium for displaying information regarding a product associated with a media object, having a plurality of components that include computer-executable instructions for causing a computer to perform actions comprising:

a first component for causing a display to a current user, based on an interaction context, a selectable representation of the media object and a selectable representation of at least one product that is available for use with the media object, wherein the display of each product that is unavailable for use with the media object is suppressed;

a second component for causing an addition of behavior information relating to the current user to a previously-stored profile associated with a repeat user, and causing a change from a temporary identifier for the current user to the permanent identifier assigned to the repeat user in response to a determination that the current user is the repeat user, and a third component for causing a storage of the behavior information relating to the current user in a new profile associated with the current user, and causing a change from the temporary identifier to a new permanent identifier assigned to the current user in response to determining that the current user is a new user.

19. A server for displaying information regarding a product associated with a media object, wherein the server performs actions comprising:

performing a rules-based analysis of a plurality of attributes associated with a user and at least one contextual user interaction, the media object, and at least one product available for use with the media object;

generating a display that includes at least one representation of the media object and at least one product that is available for use with the media object;

if the current user is determined to be a repeat user, the repeat user having a previously-assigned permanent identifier, adding behavior information relating to the current user to a previously-stored profile associated with the repeat user, and changing a temporary identifier for the current user to the permanent identifier assigned to the repeat user; and if the current user is determined to be a new user, storing the behavior information relating to the current user in a new profile associated with the current user, and changing the temporary identifier to another permanent identifier assigned to the current user.

20. The server of claim 19 wherein at least one of the previously-assigned permanent identifier, the newly-assigned permanent identifier, and the temporary identifier is included with a cookie.

21. The server of claim 19 wherein at least one of the previously-assigned permanent identifier, the newly-assigned permanent identifier, and the temporary identifier is included with a querystring parameter.

22. The server of claim 19 wherein the media object is one of an image object, an audio object, and a video object.

23. The server of claim 19 wherein the attributes include a user attribute comprising one of user rights, user behavior, user preferences, and user subscription status.

24. The server of claim 19 wherein the attributes include a media object attribute comprising one of media object properties and media object usage rights.

25. The server of claim 19 wherein the attributes include a product attribute comprising one of a product property and a product option.

26. A client for displaying information regarding a product associated with a media object, wherein the client performs actions comprising:
    performing a rules-based analysis of a plurality of attributes associated with a user and at least one contextual user interaction, the media object, and at least one product available for use with the media object;
    generating a display that includes at least one representation of the media object and at least one product that is available for use with the media object;
    if the current user is determined to be a repeat user, the repeat user having a previously-assigned permanent identifier, adding behavior information relating to the current user to a previously-stored profile associated with the repeat user, and changing a temporary identifier for the current user to the permanent identifier assigned to the repeat user; and
    if the current user is determined to be a new user, storing the behavior information relating to the current user in a new profile associated with the current user, and changing the temporary identifier to a new permanent identifier assigned to the current user.

* * * * *

UNITED STATES PATENT AND TRADEMARK OFFICE
CERTIFICATE OF CORRECTION

PATENT NO. : 7,113,921 B2  Page 1 of 1
APPLICATION NO. : 11/008063
DATED : September 26, 2006
INVENTOR(S) : Debra L. Linker et al.

It is certified that error appears in the above-identified patent and that said Letters Patent is hereby corrected as shown below:

In the Application:

Sheet 2 of 14 (Box 120), (Fig. 2), Line 3, Delete "WATEMARK" and insert

-- WATERMARK --

Column 3, Line 43-44, Delete "previously assigned" and insert -- previously-assigned --.

Column 3, Line 67, Delete "computer readable" and insert -- computer-readable --.

Column 6, Line 3, Delete "cutdown" and insert --cut-down --.

Column 6, Line 28, Delete "pictor" and insert -- picture --.

Column 10, Line 7(Approx.), Delete "path=PATH, domain=DOMAIN" and insert

-- path=PATH; domain=DOMAIN --.

Column 10, Line 52(Approx.) Delete "previously assigned" and insert

-- previously-assigned --.

Column 11, Line 44, Delete "commercial," and insert -- commercial --.

Column 16, Line 5, In Claim 18, after "actions" insert -- , --.

Signed and Sealed this

Sixteenth Day of January, 2007

JON W. DUDAS
*Director of the United States Patent and Trademark Office*